Aug. 6, 1929.  E. C. PFAFF  1,723,886
CLUTCH
Filed April 23, 1927  2 Sheets-Sheet 1

Inventor
Ernest C. Pfaff

Aug. 6, 1929.   E. C. PFAFF   1,723,886
CLUTCH
Filed April 23, 1927   2 Sheets-Sheet 2
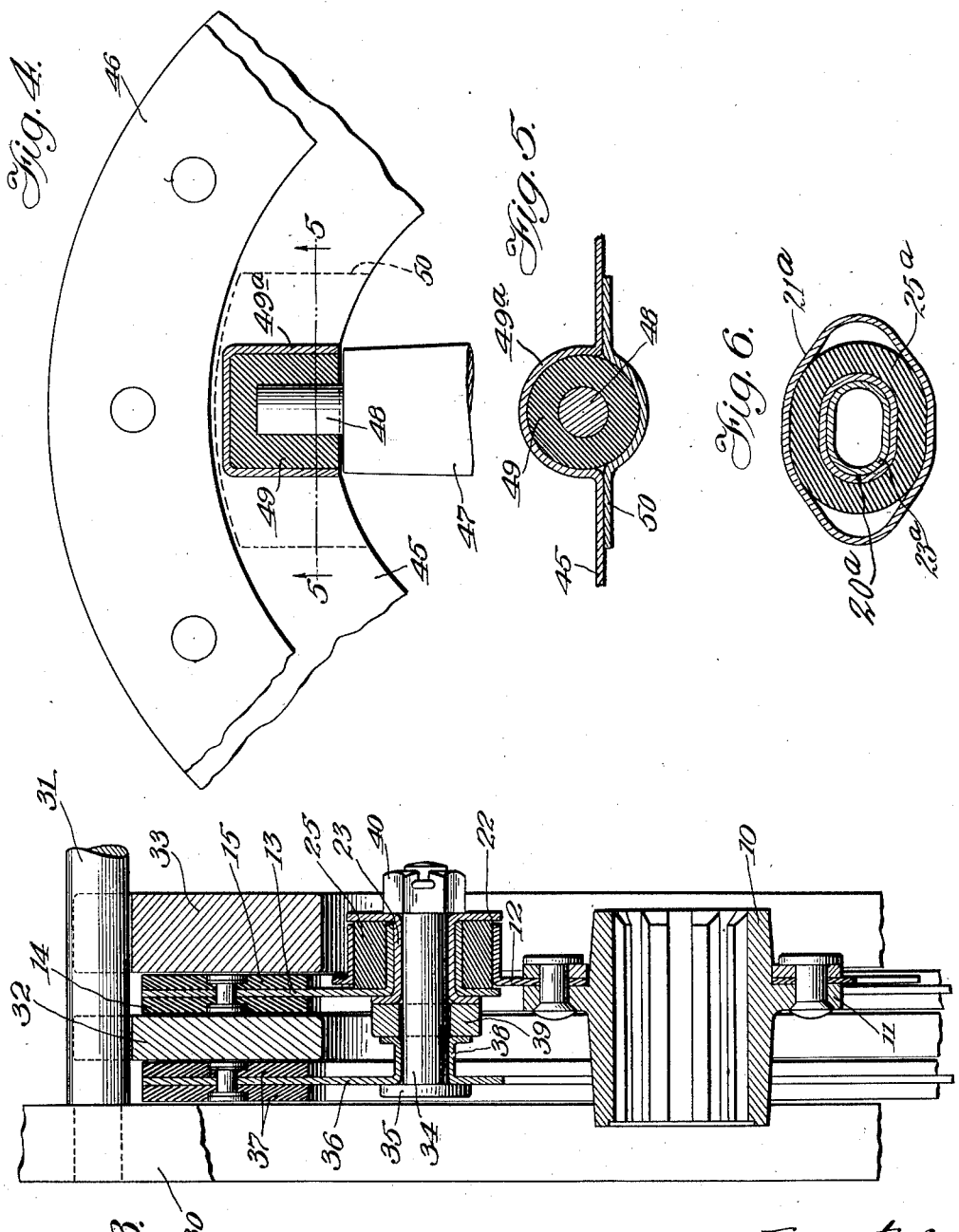

Patented Aug. 6, 1929.

1,723,886

UNITED STATES PATENT OFFICE.

ERNEST C. PFAFF, OF CHICAGO, ILLINOIS.

CLUTCH.

Application filed April 23, 1927. Serial No. 185,988.

This invention relates to a clutch mechanism, and more particularly to a flexible driven plate forming one unit thereof, the object of the invention being to obtain a torsional flexibility which will compensate for any misalignment between the driving and driven shafts. In the accomplishment of this purpose, I form the driven plate of inner and outer components connected by resilient or cushion means, this being a construction which is simple and inexpensive to produce. A clutch having these characteristics is well adapted for motor vehicles, and the description to follow will accordingly refer to a mechanism designed for this particular class of service.

A suggestive embodiment of this invention is set forth in the accompanying drawings in the manner following:

Fig. 3 is a view generally similar to Fig. 2 and shows a construction in which two clutch plates are combined with three driving members;

Fig. 4 which is a fragmentary view in elevation with a portion thereof in section, illustrates a modified type of resilient connection between the driven plate and one of the radial spokes thereof;

Fig. 5 is a detail in section taken on line 5—5 of Fig. 4; and

Fig. 6 which is a detail of a cushion insert, as well as the mounting therefor, shows one suggestive cross sectional form thereof.

Figure 1:
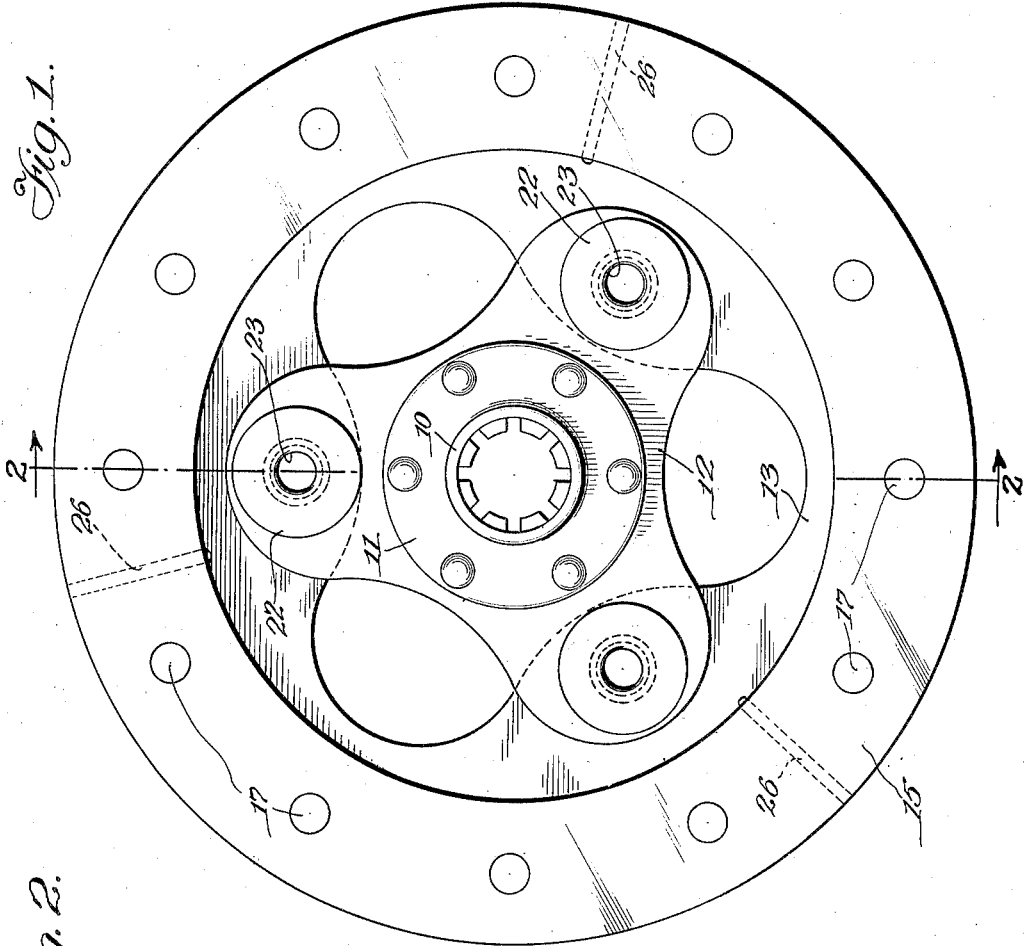
Figure 1 is a view in elevation looking toward one face of the driven plate.
Figure 2:
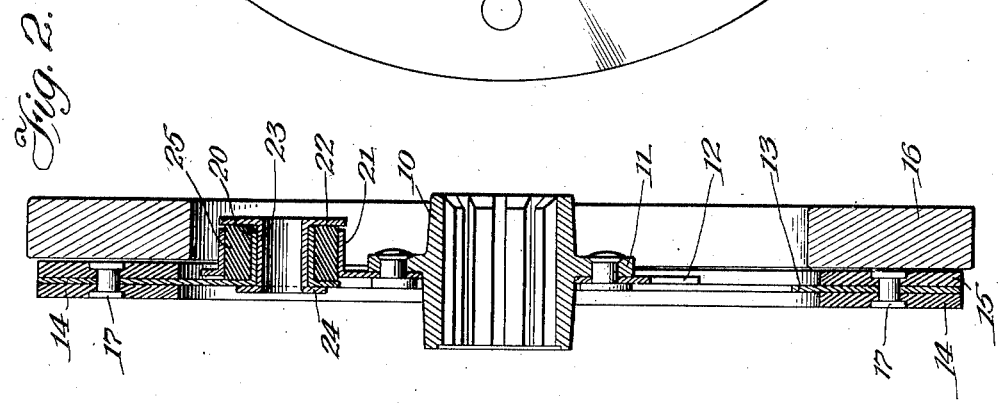
Fig. 2 is a central vertical section therethrough taken on line 2—2 of Fig. 1.

Referring particularly to Figs. 1 and 2, I have shown the driven unit of a clutch, the same comprising a hub 10 adapted to be splined on a shaft (not shown), the hub being equipped with a flange 11 to which is connected an inner plate 12 having a peripheral edge which is scalloped. An outer plate 13 also scalloped for complementary association with the inner plate is connected thereto by means which will presently be described. This outer plate carries on its opposite sides clutch facings 14 and 15, the latter being proximate to a driving member 16. The clutch facings may be secured to the outer plate as by rivets 17 in the usual manner.

The inside edge of the outer plate 13 is scalloped in such manner as to provide inwardly protruding portions which overlap the outwardly protruding portions of the scallops on the inside plate 12. As shown, there are three such overlapping scalloped portions. The material in the one plate—for example, the outer plate—is drawn to provide a laterally extending hollow boss 20 in spaced relation to a second boss 21 extending laterally from the inside plate in the same direction. The annular space which intervenes between these bosses is closed at one end by the outer plate, and at its other end by a flange 22 which extends laterally from a hollow rivet 23 which passes through the boss 20 to present an outturned edge 24 adjacent the outer plate. Within the annular space thus enclosed is positioned an insert 25 of cushion or resilient material of such thickness as to hold the inner and outer plates away from actual contact with each other. By the use of such a cushion connection between the inner and outer plates, a torsional flexibility is obtained which will compensate for any misalignment between the driving and driven shafts. These cushion connections are provided at desired points, preferably at each of the overlapping scalloped portions of the inner and outer plates, which, in the suggested construction, are 120 degrees apart. The presence of these cushion inserts in the connection between the inner and outer plates will eliminate gear thrashing noises in the transmission which are transmitted with periodic vibrations of the motor. The inserts may consist of rubber, or a rubber compound, and may incorporate therewith any suitable material such as fabric which will render the same more durable in service. Also the flexible character of this construction may be further enhanced by providing certain radial slots 26 in the outer plate, as suggested in Fig. 1, this being an optional feature however.

In Fig. 3 I have shown a generally similar construction in which two driven plates are interposed between three driving members one of which may be the motor fly wheel 30. Extending laterally from the wheel are bolts 31 which transmit rotary motion to other driving members 32 and 33, the latter corresponding in position to the driving member 16 which is shown in Fig. 2. Adjacent this driving member is a clutch plate similar in all substantial respects to the one already described, the several parts thereof being designated by similar reference numerals. In addition to rivets 23, I utilize bolts 34 each having a head 35 bearing against a second clutch plate 36 which is positioned between the fly wheel 30 and driving member 32. Clutch facings 37 are carried upon the opposite sides of this clutch plate in the usual manner. As shown, this clutch plate is provided with a series of laterally extended bosses 38 surrounding the bolts 34, which latter are extended through the rivets 23. If desired, spacer rings 39 may be interposed between the bosses 38 and rivets 23 whereby the two clutch plates are held apart a fixed distance. A nut 40 on each bolt 34 bears against the flange 22 of the associated rivet so as to secure these parts in the relation described.

The advantages of this invention may also be realized by the construction which is shown in Figs. 4 and 5. In this example, the clutch plate 45 is equipped with facings 46 in the usual manner, and is connected to a hub (not shown) by spokes 47 having, if desired, an integral formation therewith. Each spoke adjacent its outer end is provided with a radially extending pin 48 receivable within a socket formed in a cushion insert 49 which may be of cylindrical contour, as shown. The cushion insert is rested within a seat 49$^a$, provided by a suitable lateral extension of the plate 45, the insert being locked in place by a cap plate 50 which is secured to the plate 45 as by welding. In this manner, I provide a flexible driving connection between the clutch plate and its hub, and realize the advantages which inhere in the construction previously described.

The particular cross sectional form of the cushions or inserts is of relatively small importance. They may be cylindrical, as when formed from tubing cut to the required lengths, or they may also be of oblong or elliptical formation, as suggested in Fig. 6. Also they may be of one piece, or be laminated, according as is found desirable. These are features of relative unimportance, the principal requirement being that such inserts have cushion properties such as to provide a torsional flexibility. By reference to Fig. 6 it will be noted that the wall 21$^a$ surrounding the insert 25$^a$ is unequally spaced from the boss wall 20$^a$. This is for the purpose of providing accommodation for the insert body when displaced circumferentially in response to pressure directed endwise thereupon when the clutch is being engaged. It is evident, of course, that the particular shape of this wall may be varied without loss of the advantage just noted.

I claim:

1. A clutch mechanism in which is included a driven member comprising inner and outer flexible plates, the latter receiving engagement from a driving member, portions of the two plates being in overlapping relation, and cushion means connecting the two plates through such overlapping portions, substantially as described.

2. A clutch mechanism in which is included a driven member comprising inner and outer flexible plates each configured to present complementary portions in overlapping relation to the other, the inner member being connected to a hub and the outer member receiving engagement from a driving member, and cushion means connecting the two plates at points of overlap, substantially as described.

3. A clutch mechanism in which is included a hub, a radially extending flexible plate in connection with the hub, means extending laterally from the plate forming a continuous wall, an outer plate spaced from the hub and having a portion of itself laterally extended to provide a continuous wall which lies inwardly and spaced from the corresponding wall of the inner plate, a cushion insert disposed within the space between the two continuous walls and serving to prevent contact between the two plates, and means for confining the insert in place, substantially as described.

4. A clutch mechanism in which is included a driven member comprising inner and outer flexible plates with spaced overlapping portions, and connections between such overlapping portions comprising walls extending laterally from each in spaced relation, a cushion insert between such spaced walls, and means independent of the two plates forming a connection therebetween and a retainer for the insert, substantially as described.

5. A clutch mechanism in which is included a driven centrally apertured plate, a hub arranged centrally of the plate, a second plate in connection with the hub, the two plates each having separated portions overlapping the other, and lateral extensions in the form of walls spaced from each other, cushion inserts within such spaces, and means extending between the two plates for holding the inserts in place, substantially as described.

6. A clutch mechanism in which is included a driven plate adapted to receive engagement from a driving member, a hub arranged centrally of the plate, a second plate connected fast with the hub and overlapping the plate first named at separated points, there being portions extended laterally from the two plates providing therebetween an enclosure, a cushion insert fitted within said enclosure the walls of which are spaced therefrom sufficiently to accommodate displacement of the insert due to compression, the insert being arranged to prevent contact between the two plates, and means extending through the two plates for connecting them in unitary relation, substantially as described.

ERNEST C. PFAFF.